United States Patent [19]
Decouzon et al.

[11] 3,760,649
[45] Sept. 25, 1973

[54] AUTOMOTIVE SAFETY STEERING SYSTEMS

[75] Inventors: Georges Decouzon; Marcel Misseri; André Chalesle, Billancourt, France

[73] Assignees: Regie Nationale des Usines Renault, Billancourt (Hauts de Seine); Automobiles Peugeot, Paris, both of France

[22] Filed: June 24, 1971

[21] Appl. No.: 156,416

[52] U.S. Cl. ................................................ 74/492
[51] Int. Cl. ............................................. B62d 1/18
[58] Field of Search .......................... 74/492, 493

[56] References Cited
UNITED STATES PATENTS
| | | | |
|---|---|---|---|
| 2,716,032 | 8/1955 | Barenyi | 74/493 X |
| 3,472,093 | 10/1969 | Tenniswood | 74/492 |
| 3,477,307 | 11/1969 | Maddox | 74/492 |
| 3,495,474 | 2/1970 | Nishimura et al. | 74/492 |

*Primary Examiner*—Milton Kaufman
*Attorney*—Stevens, Davis, Miller & Mosher

[57] ABSTRACT

This safety device, adapted to permit the separation of two sections of a steering column assembled by means of one or more universal joints and a connecting joint comprising two separable elements having a common axis of rotation, is characterized in that at least one of the separable elements of the transmission joint comprises an aperture of which the walls are adapted to co-act with a driving member rigid with the other element, said last-named element being kept in engagement with the walls of said aperture by means of a tension device.

5 Claims, 11 Drawing Figures

PATENTED SEP 25 1973          3,760,649

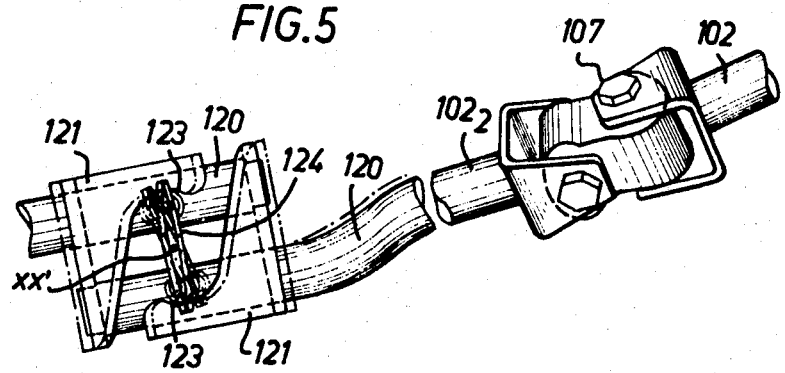
FIG.5
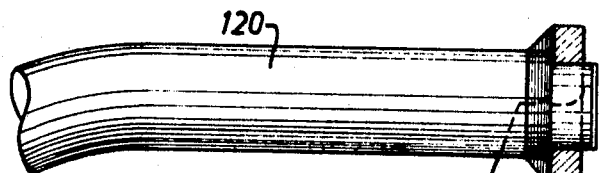
FIG.6
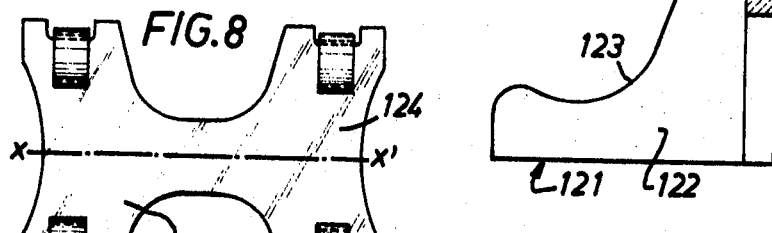
FIG.8
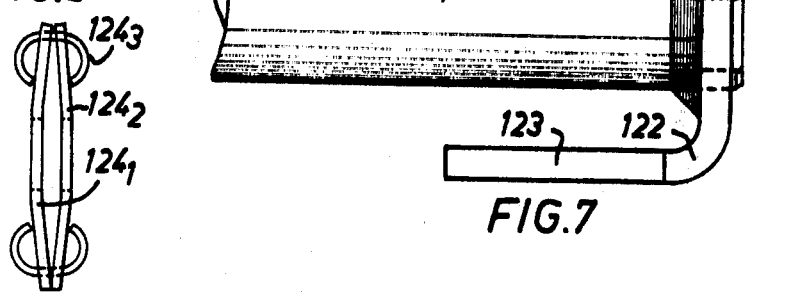
FIG.9
FIG.7

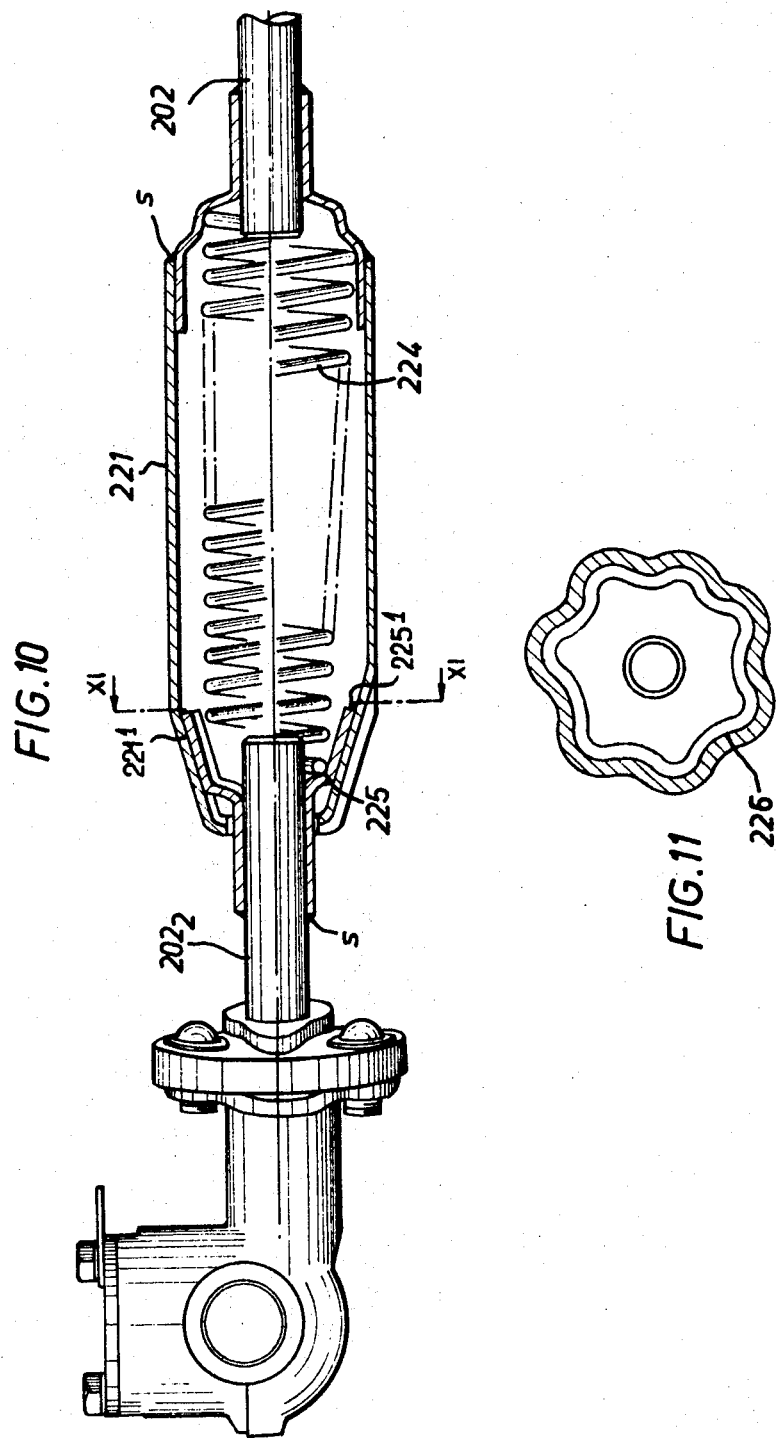

AUTOMOTIVE SAFETY STEERING SYSTEMS

This invention relates to safety steering systems of motor vehicles and has specific reference to a system of this character comprising a steering column made of several successive sections disposed between the steering wheel and the steering gearbox.

Steering columns of automotive vehicles are already known wherein a shaft is adapted to collapse or sink in case of sudden, strong shock at the front end of the vehicle, or under the pressure produced by the passenger thrown forward in case of crash. These known devices are objectionable on account of their insufficient degree of safety when the impact is directed obliquely with respect to the axis of the steering column, thus exerting a thrust against the steering gearbox in the very frequent cases of crashes that are not exactly frontal ones.

For the sake of simplification, another proposition consisted in interposing between the steering wheel and the steering column a deformable member the resistance of which increases as it is distorted by a shock or pressure. This member is capable of damping out the shock produced by the driver's chest against the steering column. However, the maximum or permissible wheel stroke may in many cases prove inadequate for ensuring an efficient protection of the driver when the latter, if not retained by a safety harness, is thrown against the wheel.

To cope with this drawback, safety devices have been developed with a view to prevent the passengers from being thrown forward, i.e. towards rigid portions or elements of the vehicle body, by using inflatable bladders or the like.

Thus, in case of front crash or shock, the bladder is inflated automatically and when the driver's or passenger's chest engages this bladder the opposed forces involved are somewhat balanced and the bladder is then gradually deflated. To be really efficient, a device of this character must be so arranged and disposed that the distance between the passenger and the protection surface provided by this device can vary only as a function of the forward movement of the passenger towards this protection surface. In fact, it is hardly desirable to permit the backward movement of the steering column into the passenger compartment during movements of the steering gearbox, notably when the steering column is inclined considerably with respect to the longitudinal axis of the vehicle.

In view of the foregoing, steering columns have been developed which consisted of two adjacent and aligned sections. Thus, in case of overload, these two sections are disconnected from each other or move in relation to their junction point.

To permit the severance of the two sections of a steering column of this type in case of axial and lateral stresses conducting to a displacement of the steering gearbox, it is the essential object of the present invention to provide a safety device wherein the two sections of a steering shaft are connected to each other by means of a tension member and formed with notches enabling said sections to penetrate into each other during the transmission of the rotary torque exerted on the rim of the steering wheel.

Another object of the present invention consists in providing a safety device adapted to cause the two sections of a steering column to become disconnected from each other under a relatively reduced load, whereby any increment in the load applied to one section is ineffective on the other section.

This device, which comprises a tube surrounding the steering column, a steering column proper divided into sections assembled by means of either one or two universal joints and a connecting member of which the connecting member consists of a pair of separable elements admitting a common axis of rotation, is characterized in that at least one of said separable elements of said connecting member comprises an opening of which the lateral walls are adapted to co-act with a driving member rigid with the other element, said last-named element being urged by a tension device for engagement with the walls of said opening.

According to a preferred form of embodiment of this device, one of the separable elements consists of a washer formed with peripheral notches, rigid with one section of said steering shaft, and the other element rigid with the other section of the steering shaft carries a plurality of teeth held by a deformable collar in contact with the walls of said notches.

Another advantageous form of embodiment of the device consists in slightly cranking the two sections of the steering shaft and assembling these sections with each other by means of a pair of straps formed with an aperture permitting the passage of the steering shaft, whereby the strap rigid with one of said sections will clamp the section rigid with the other strap by means of a displaceable tension device. Thus, a steering shaft thus assembled will have its front portion located in the vicinity of the fixed steering wheel, for any sliding movement of the shaft in the direction from the front to the rear of the vehicle is safely prevented.

According to a complementary form of embodiment of this device, the two sections of the steering shaft are rigid the one with a sleeve member and the other with a bell-shaped member, both members being formed with frustoconical surfaces adapted to transmit the torque received from the steering wheel and to be disconnected in case of relative movements between the two sections.

Thus, if the circumstances of a crash are such that the driver's body is thrown against the steering wheel by its inertia, the thrust thus produced will only cause the steering shaft to move forwards. On the other hand, if the circumstances of the crash are such that it is the steering column that tends to move backwards, i.e. toward the driver's trunk, any sliding movement of the steering shaft in its support is positively prevented and it is the portion thereof that extends ahead of the device that moves during the deformation of the front structure of the vehicle.

Other features and advantages of the invention as the following description proceeds with reference to the attached drawings showing diagrammatically by way of example three typical forms of embodiment of the safety steering system of this invention. In the drawing:

FIG. 5 is a modified form of embodiment of the device;

FIG. 6 is a section showing one of the assembling members of the device illustrated in FIG. 5;

FIG. 7 is a plan view from above of the member shown in FIG. 6;

FIGS. 8 and 9 are detail views of the tension device incorporated in the form of embodiment of FIG. 5; and FIGS. 10 and 11 are an axial section and a cross section, respectively, showing a modified form of embodiment of the device and notably the corrugations between the surfaces in mutual contact.

Figure 1:
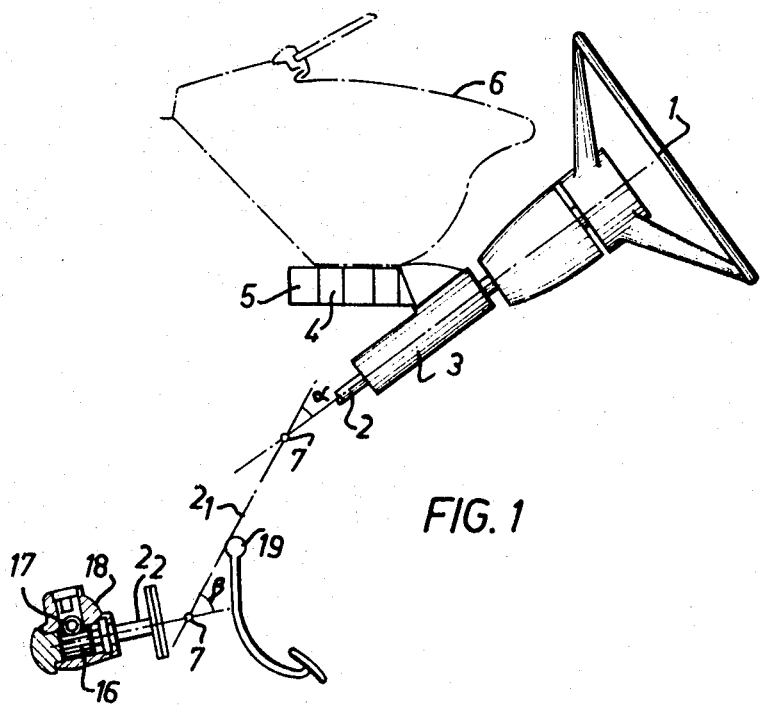
FIG. 1 is a diagrammatic section showing the steering column arrangement positioned in a vehicle.

Referring first to FIG. 1 the steering wheel 1 is rigid with the rear section 2 of the steering shaft housed within a tube or sheath 3. Collars 4 rigid with an arm 5 of sheath 3 are provided for securing this sheath to one facia or instrument panel 6.

Figures 3, 4:
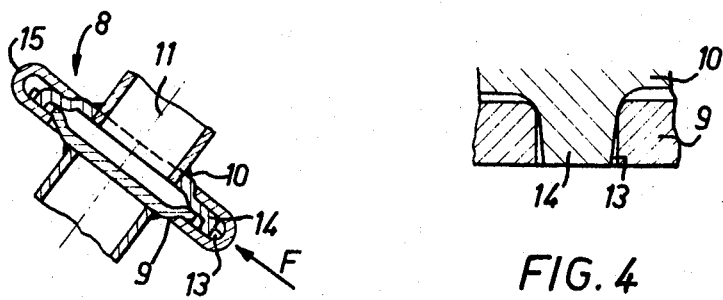
FIG. 3 is a section taken along the line III—III of FIG. 2.
FIG. 4 is a fragmentary view of the device as seen in the direction of the arrow F of FIG. 3.
Figure 2:
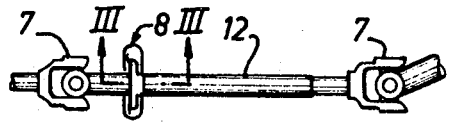
FIG. 2 is a fragmentary view showing more in detail one portion of the system of FIG. 1.

The steering column comprises three sections 2, $2^1$ and $2^3$ in the example illustrated. Section 2 is connected to section $2^2$ through section $2^1$ onnected in turn to sections 2 and $2^2$ by means of universal joints 7. In the construction illustrated section $2^1$ is the intermediate section 12 of FIG. 2, in which a connecting joint 8 is interposed. This connecting joint 8 consists of a pair of separable elements 9, 10 (FIG. 3) having a common axis of rotation 11.

Element 9 consists of a washer welded to the tube constituting the steering shaft section 12, and comprises peripheral notches 13. The other element 10 consists of a washer similarly welded to the tubular section 12 of the steering shaft, and comprises curved teeth 14 having a root width somewhat greater than the width of the corresponding notches 13 of element 9.

The number of teeth and notches is calculated to ensure a proper transmission of the torque applied by the driver to the wheel 1.

A deformable clamping collar 15 is crimped around the edges of washers 9 and 10. Its function is to avoid the accidental development of play between these elements 9 and 10.

According to a specific feature characterizing this device, the latter is mounted in the intermediate section 12 of the steering shaft which is bounded by the two universal joints 7, whereby the rear section 2 of the steering shaft forms an angle $\alpha$ with the intermediate section 12. Similarly, the front section $2^2$ of the steering column forms an angle $\beta$ differing from angle $\alpha$, with the intermediate section 12. In FIG. 1 it will be seen that the front section $2^2$ drives the pinion 16 of the rack-and-pinion steering gear 16, 17 housed in a casing 18 constituting the steering gearbox.

According to a specific feature of this device, the intermediate section 12 lies in closed proximity of the pivot pin 19 of the control pedals, or of any other suitable fixed point of the vehicle structure.

The above described form of embodiment of the device operates as follows:

Let us assume that a shock is produced at the front of the vehicle. The gearbox 18 will move slightly toward the intermediate section 12. Due to the inequality of angles $\alpha$ and $\beta$, the resultants of the efforts applied to each universal joint 7 are also unequal and produce an effort tending to separate the elements 9, 10 of connecting joint 8 from each other. Let angles $\alpha = 30°$ and angle $\beta = 45°$: in this case, the elements of connecting joint 8 will separate from each other without any difficulty.

It will also be seen that in case the intermediate section abuts against the pivot pin 19 of the control pedals, the elements of joint 8 will also be detached from each other.

FIGS. 5 to 9 inclusive of the drawings illustrate a modified form of embodiment of the device wherein the universal joints 7 are replaced by a single twin universal joint 107 having its forks rigid with the rear section 102 and front section $102^2$ of the steering column, respectively.

The front section $102^2$ consists of a pair of cranked elements 120 each rigidly assembled with a strap 121. Each strap 121 has two wings 122 formed with cam faces or ramps 123 constituting the bearing surfaces of a tension device 124. This tension device comprises a pair of plates $124^1$, $124^2$ assembled by means of spring rings $124^3$ (FIGS. 8, 9). Each strap 121 is provided on the other hand with an aperture permitting the passage of the elements 120 of front section $102^2$.

This device operates as follows:

As a consequence of a shock produced at the front of the vehicle the steering gearbox is caused to recede towards the device. Due to the backward thrust exerted by the cranked element 120, the tension device 124 pivots about the axis $x'x$ (FIG. 8). This pivotal movement of tension device 124 (shown in dash and dot lines in FIG. 5) causes the straps 121 to be guided during their movement in relation to the section elements 120.

Under these conditions, it is clear that one of the elements 120 of the front section $102^2$ of the steering shaft remains stationary during the backward movement of the other element, and that the torque impressed to the steering wheel is nevertheless transmitted if the shock is of moderate magnitude.

It will also be seen that with this device it is possible to cause the straps to be gradually separated from the section surrounded thereby if the shock produced at the front of the vehicle is attended by a substantial displacement of the steering gearbox.

A third form of embodiment of the safety device of this invention is illustrated in FIGS. 10 and 11 of the drawings. In this construction the front section $202^2$ is rigid with a sheet-metal bell-shaped member 225 having a frustoconical contact surface $225^1$. A sleeve member 221 formed with a frustoconical surface $221^1$ matching that $225^1$ of bell-shaped member 225 is rigidly assembled with the rear section 202 connected as already explained hereinabove to the universal joint 107 of FIG. 5. A compression spring 224 is provided for assembling the tapered surfaces of sleeve member 221 and bell-shaped member 225 while preventing any accidental relative movements between these tapered surfaces in mutual engagement. In case of crash or shock at the front of the vehicle the backward movement of the steering gearbox will disconnect the two sections while compressing the spring 224.

In order properly to transmit the torque applied by the driver to the steering wheel of the vehicle (not shown) the mutually engaged tapered surfaces are provided with axial teeth or corrugations 226 having matching contours and obtained by a pressing operation before assembling the component elements of the device, as clearly illustrated in FIG. 11, showing the cross section X X' of FIG. 10. The bell-shaped member 225 and sleeve member 221 are rigidly assembled with the front section $202^2$ and rear section 202, respectively, of the steering column, after the assembling by means of weld seams s.

Of course, this invention should not be construed as being strictly limited to the specific forms of embodiment illustrated and described herein, since various modifications may be brought thereto without departing from the basic principles of the invention, as set forth in the appended claims, such modifications being readily apparent to those skilled in the art.

We claim:
1. A safety device permitting the disconnection of a pair of sections of a steering shaft assembled by means of at least one universal joint and a connection joint having two separable elements with a common axis of rotation, said connecting joint comprising:
 a first washer member formed with peripheral notches engaging one section of said steering shaft,
 a second member carrying a plurality of teeth engaging the other section of the steering shaft, and
 deformable collar means for holding said plurality of teeth of said second member in engagement with the walls of the notches of the first member whereby the two elements are disconnected from each other upon receiving axial or lateral stresses.

2. A safety device permitting the disconnection of a pair of sections of a steering shaft assembled by means of at least one universal joint and a connection joint having two separable elements with a common axis of rotation, said connecting joint comprising:
 a first strap member provided with an opening permitting the passage of one section of said steering shaft and rigidly connected thereto,
 a second strap member provided with an opening permitting the passage of the other section of the steering shaft and rigidly connect thereto, and
 displaceable tension means for holding said first and second members in engagement whereby the two elements are disconnected from each other upon receiving axial or lateral stresses.

3. A safety device according to claim 2, in which the sections constituting the steering shaft extending through each strap are parallel and that the displaceable tension means is in bearing engagement with ramps formed on the wings of said straps, whereby the aperture of one strap surrounds the steering shaft section rigid with the other strap during the relative movements of said two straps.

4. A safety device permitting the disconnection of a pair of sections of a steering shaft assembled by means of at least one universal joint and a connection joint having two separable elements with a common axis of rotation, said connecting joint comprising:
 a first bell-shaped member engaging one section of said steering shaft and having a frustroconical surface,
 a second sleeve member engaging the other section of the steering shaft and having a frustroconical surface in engagement with frustroconical surface of said member and
 spring means interposed between the ends of the said one section and the said other section for holding said first and second members in engagement whereby the two elements are disconnected from each other upon receiving axial or lateral stresses.

5. A safety device according to claim 4, in which the peripheral surfaces of the mutually engaging frustroconical surfaces are formed with matching corrugations.

* * * * *

UNITED STATES PATENT OFFICE
CERTIFICATE OF CORRECTION

Patent No. 3,760,649          Dated September 25, 1973

Inventor(s) George Decouzon; Marcel Misseri et al

It is certified that error appears in the above-identified patent and that said Letters Patent are hereby corrected as shown below:

In the heading of the Patent, please add the following pertinent information under Foreign Application Priority Data:

--August 7, 1970 France ............ 70/29307 --

Signed and sealed this 16th day of July 1974.

(SEAL)
Attest:

McCOY M. GIBSON, JR.          C. MARSHALL DANN
Attesting Officer              Commissioner of Patents